United States Patent [19]
Wooderson

[11] Patent Number: 5,980,065
[45] Date of Patent: Nov. 9, 1999

[54] SUBMERSIBLE LIGHT

[75] Inventor: Blaise M. Wooderson, Olathe, Kans.

[73] Assignee: Petersen Manufacturing Company, Grandview, Mo.

[21] Appl. No.: 09/183,466

[22] Filed: Oct. 30, 1998

[51] Int. Cl.⁶ .................................................. F21V 31/00
[52] U.S. Cl. ......................................... 362/267; 362/485
[58] Field of Search .................................. 362/485, 544, 362/240, 267

[56] References Cited

U.S. PATENT DOCUMENTS

| | | | |
|---|---|---|---|
| D. 267,202 | 12/1982 | Potts | D26/35 |
| 1,133,536 | 3/1915 | Chase . | |
| 3,115,307 | 12/1963 | Dickson . | |
| 3,902,057 | 8/1975 | Violette | 362/267 |
| 4,380,793 | 4/1983 | Potts | 362/267 |
| 4,445,165 | 4/1984 | Sherwood et al. | 362/376 |
| 4,617,617 | 10/1986 | Cunningham et al. | 362/267 |
| 5,060,121 | 10/1991 | Cunningham et al. | 362/267 |
| 5,136,484 | 8/1992 | Eaton | 362/267 |
| 5,150,959 | 9/1992 | Paffrath et al. | 362/226 |
| 5,295,054 | 3/1994 | Baader et al. | 362/267 |
| 5,508,894 | 4/1996 | Payne et al. | 362/267 |

Primary Examiner—Stephen Husar
Attorney, Agent, or Firm—Mark E. Brown; Litman, Kraai & Brown, LLC

[57] ABSTRACT

A submersible light includes a back cover which mounts the light. A lens assembly is mounted on the back cover and forms a downwardly-open enclosure therewith. A light assembly, which includes an illumination subassembly, is received in the enclosure. The light assembly includes a housing which engages a sealing gasket within the enclosure for sealing the light assembly against water infiltration. A second barrier against water infiltration is provided by the bell jar effect of the back cover of the lens assembly, which collectively form a downwardly-open enclosure for receiving the light assembly.

19 Claims, 6 Drawing Sheets

SUBMERSIBLE LIGHT

BACKGROUND OF THE INVENTION

1. Field of the Invention

The present invention relates generally to vehicle lights and in particular to a submersible light for boat trailers and the like.

2. Description of the Prior Art

Vehicles and other devices are equipped with a wide variety of lights for illumination, signaling, safety and other purposes. For example, lights are commonly provided on vehicles for illuminating their paths of travel and for alerting other drivers to their positions and courses.

Trailers comprise a class of vehicles which are subject to specific lighting requirements for operation on public streets and highways. Such requirements are often met by mounting discrete, self-contained lights on the trailer frames. Certain types of trailers, such as boat trailers and flat bed trailers, have exposed frames which are well suited for mounting discrete, self-contained lights. Installing self-contained trailer lights can simplify trailer construction, particularly as compared to more complicated procedures in which light assemblies are integrated into vehicle bodies. This latter type of procedure is commonly used in the manufacture of passenger vehicles.

Weatherability is an important design requirement for lights that are exposed to the elements, such as those mounted on vehicles. A further design requirement for boat trailer lights is that they be submersible. In operation, boat trailers are typically subjected to at least partial submersion when boats are launched and retrieved. A common procedure for boat launching and retrieval involves backing the boat and trailer down a boat ramp until the boat trailer is submerged and the boat can be floated off of it. Tail lights on boat trailers can thus be subjected to repeated emersion.

Various solutions have been proposed to provide submergibility in vehicle lights, particularly trailer lights. For example, the Cunningham et al. U.S. Pat. No. 4,617,617 discloses a submersible taillight assembly for a boat trailer. Water is excluded from entering this light assembly when submerged by air entrapped within a capsule light assembly housing. The Payne et al. U.S. Pat. No. 5,508,894 discloses a boat trailer light assembly with an integral bulb fixture molded to an external housing. The internal enclosure forms a watertight compartment in which the bulb is mounted. A gasket is provided for sealing the enclosure.

Heretofore there has not been available a submersible light for trailers and the like with the advantages and features of the present invention.

SUMMARY OF THE INVENTION

In the practice of the present invention, a submersible light is provided for mounting on vehicles, such as boat trailers, and for other suitable applications. The light includes a back cover, a lens assembly and a light assembly. The back cover and the lens assembly collectively form an enclosure. The lens assembly includes an open back which mounts the back cover and an open bottom. A foam rubber sealing gasket is mounted on a top panel of the lens assembly within the enclosure. An auxiliary lens can be mounted within the enclosure adjacent to a respective lens assembly side panel. A front panel of the lens assembly can be embossed with a suitable reflex and/or fresnel lens treatment.

The light assembly includes a transparent, open-top housing which receives an illumination subassembly comprising bulbs, sockets, a mounting bracket and leadwires. The housing, with the illumination subassembly mounted therein, is inserted in the enclosure through its open bottom until the housing upper edge sealingly engages the sealing gasket for providing a sealed housing as a first protective barrier to water infiltration. A second protective barrier to water infiltration is provided by a bell jar effect of the back cover and the lens assembly whereby water is excluded from the enclosure when the light is submerged.

OBJECTS AND ADVANTAGES OF THE INVENTION

The principal objects and advantages of the present invention include: providing a submersible light; providing such a light which is adapted for mounting on various vehicles; providing such a light which is particularly well adapted for use on a boat trailer; providing such a light which is submersible; providing such a light which provides tail light, brake light, turn signal, license plate illumination and side marker lighting functions in connection with a vehicle; providing such a light which provides multiple barriers against water infiltration; providing such a light which accommodates relatively easy bulb replacement; providing such a light which utilizes standard, readily available bulbs; providing such a light which can be easily manufactured in right and left-hand versions; providing such a light which includes some components which are compatible for both right and left-hand versions; providing such a light which accommodates various lens treatments, including reflex and fresnel; and providing such a light which is economical to manufacture, efficient in operation and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

I. Introduction and Environment

Figure 1:
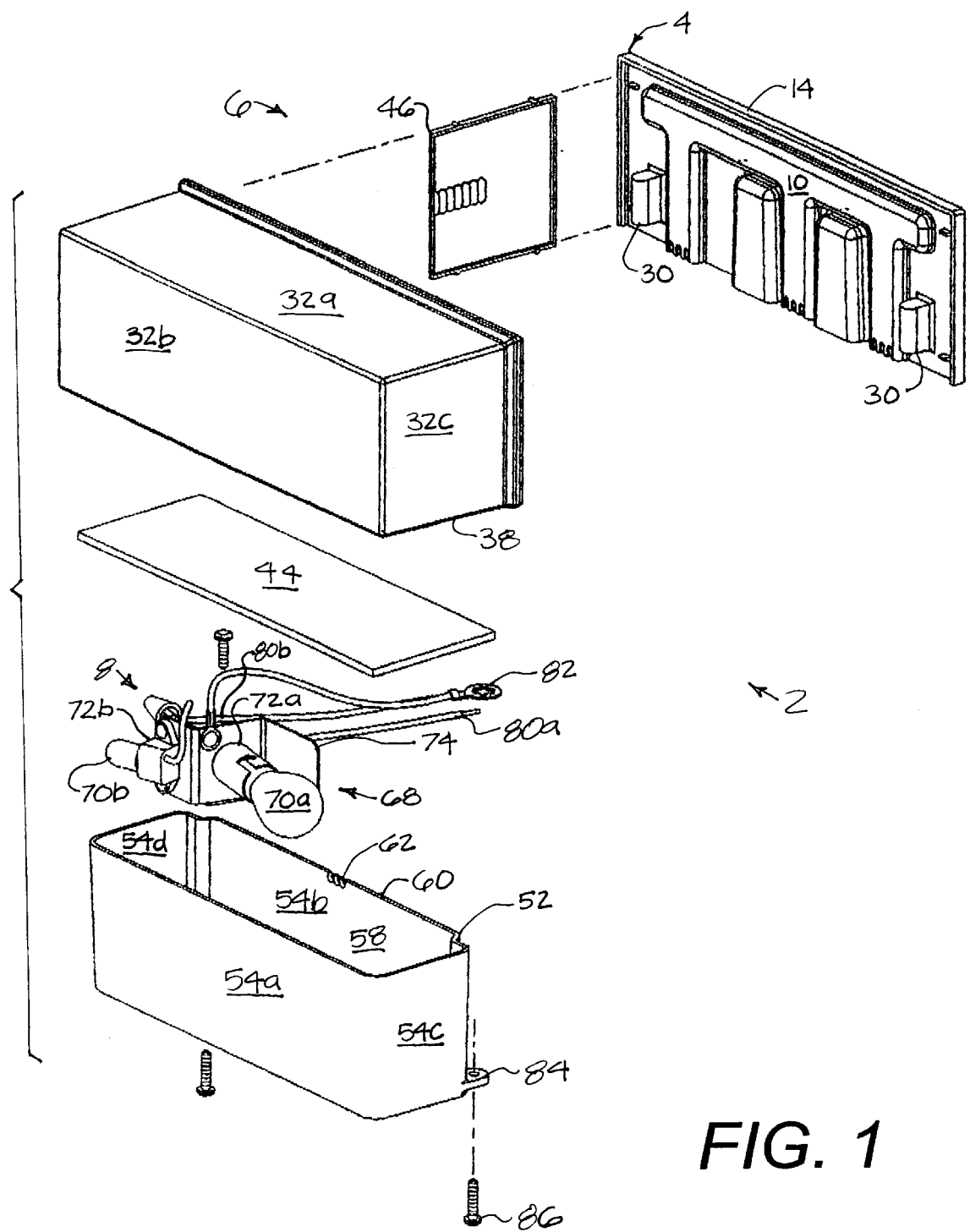
FIG. 1 is an exploded, upper, front, left side perspective view of a submersible light embodying the present invention.
Figure 2:
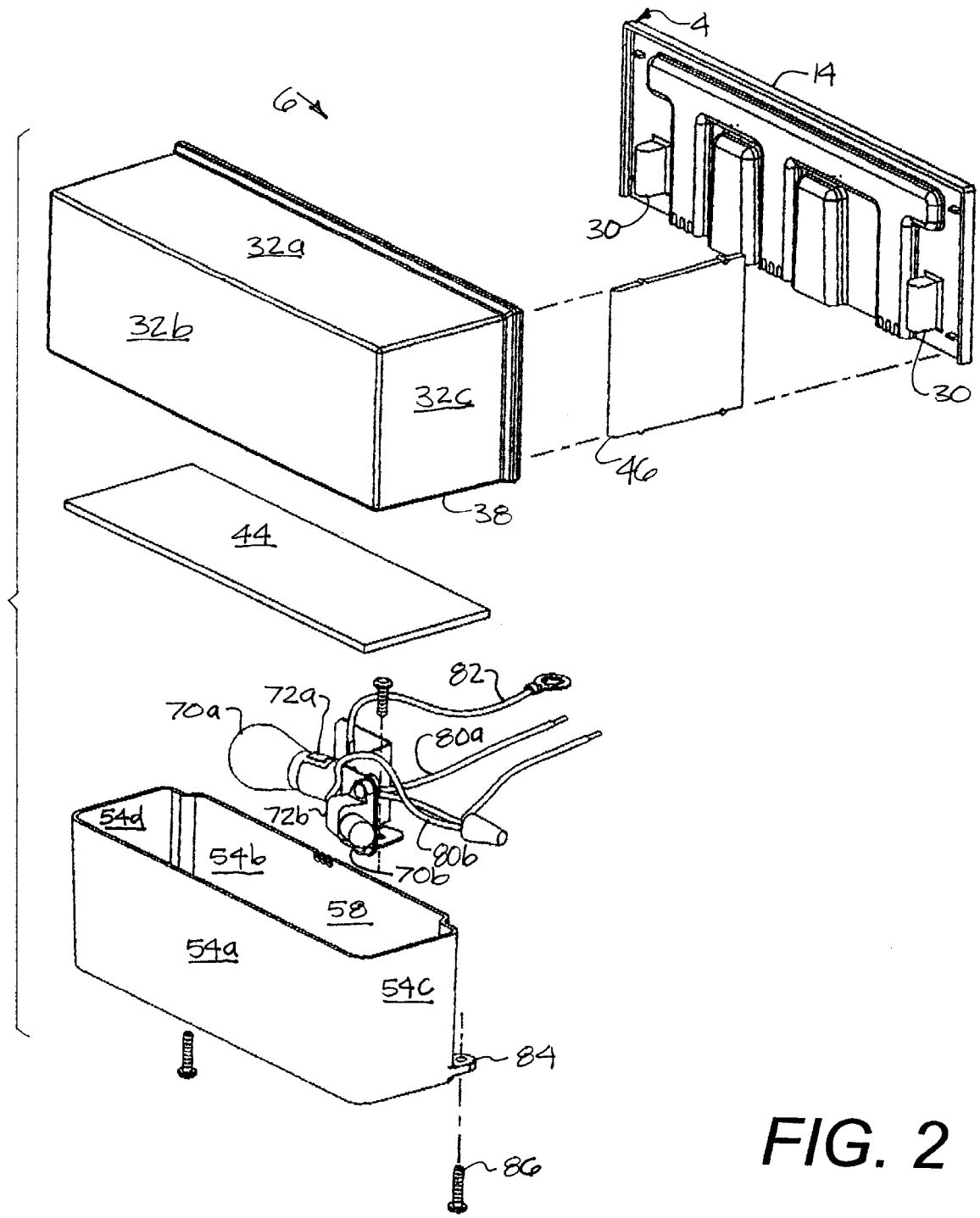
FIG. 2 is an exploded, upper, rear, left side perspective view thereof.
Figure 3:
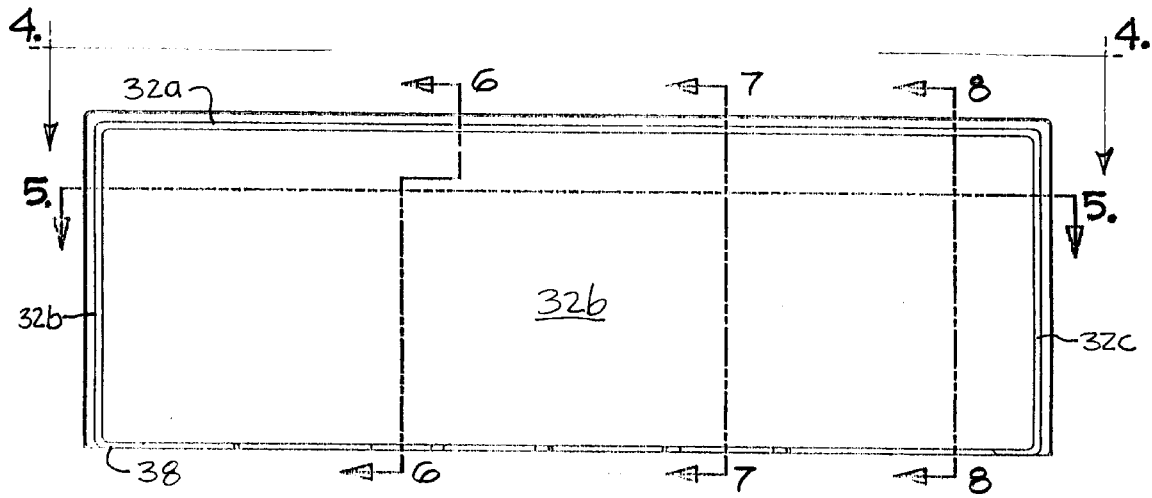
FIG. 3 is a front elevational view thereof.
Figure 4:
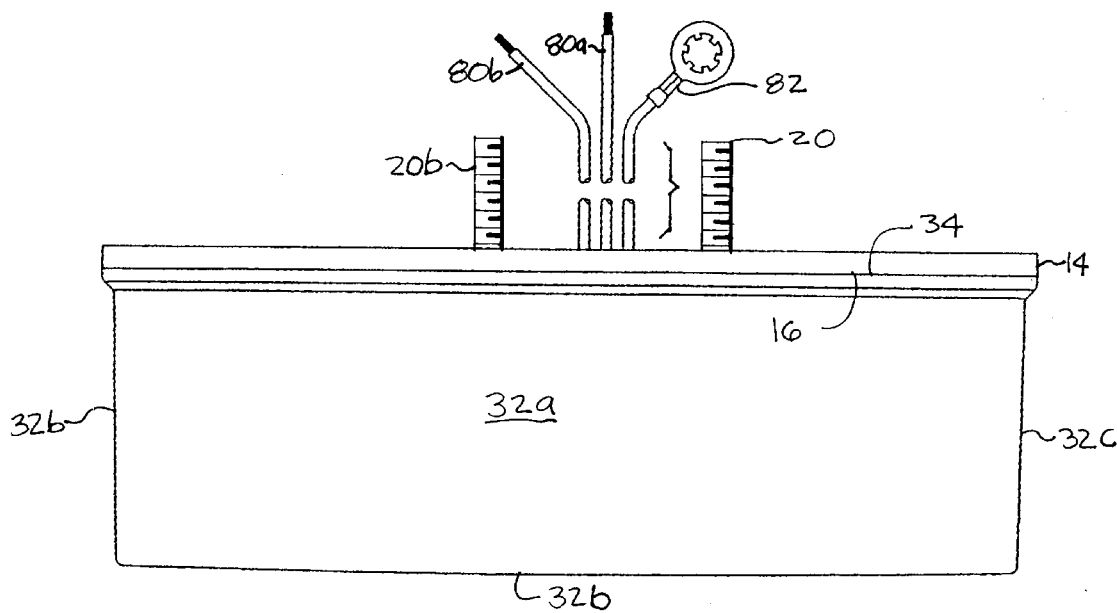
FIG. 4 is a top plan view thereof taken generally along line 4—4 in FIG. 3.
Figure 5:
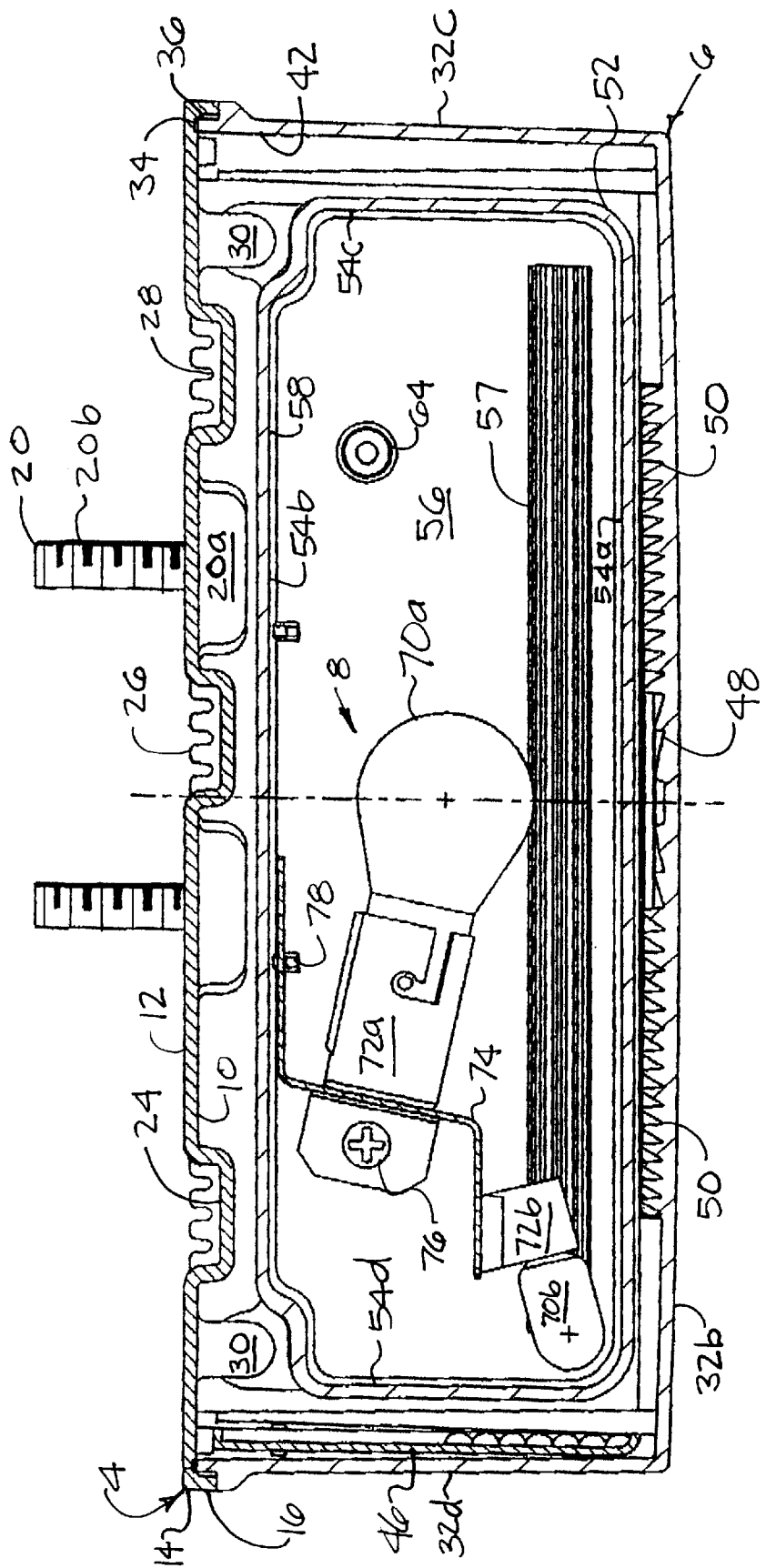
FIG. 5 is a horizontal cross-sectional view thereof, taken generally along line 5—5 in FIG. 3.
Figure 8:
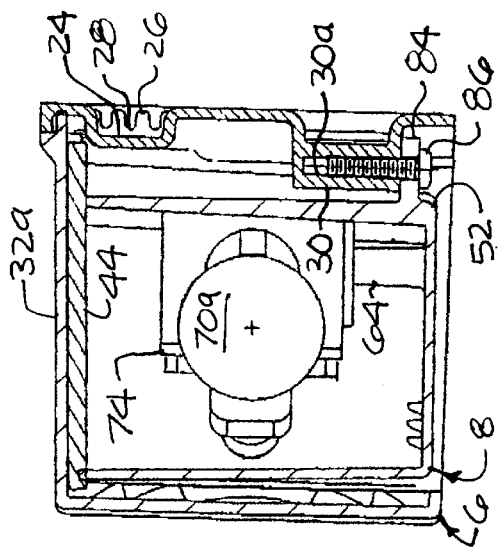
FIG. 8 is a vertical, transverse, cross-sectional view thereof, taken generally along line 8—8 in FIG. 3.
Figure 7:
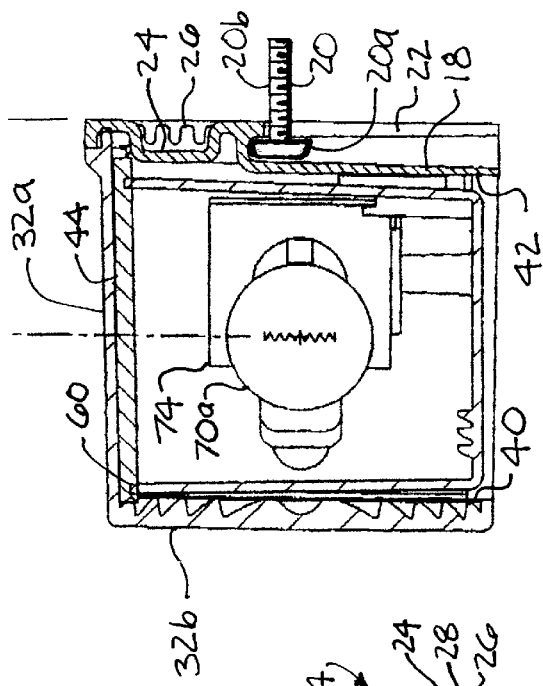
FIG. 7 is a vertical, transverse, cross-sectional view thereof, taken generally along line 7—7 in FIG. 3.
Figure 6:
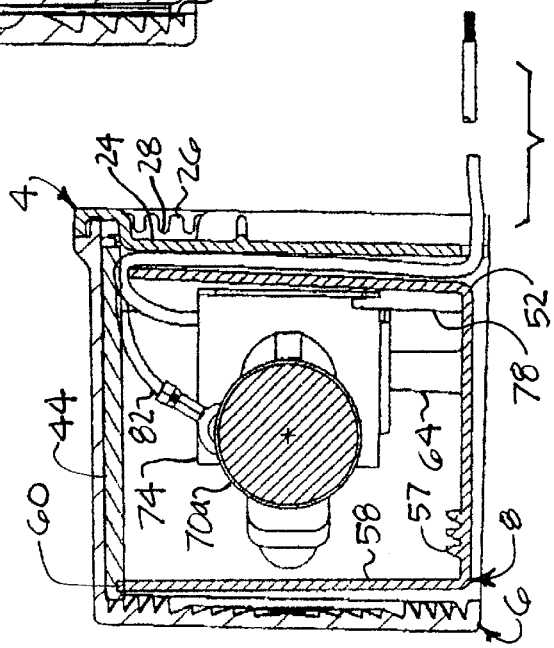
FIG. 6 is a vertical, transverse, cross-sectional view thereof, taken generally along line 6—6 in FIG. 3.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 2 generally designates a submersible light embodying the present invention. Without limitation on the generality of useful applications of the submersible light 2, it can be installed on various vehicles, such as boat trailers, for side, turn signal, tail light and clearance light functions. With appropriate modifications, the light 2 could perform other functions, such as a back-up light, license plate illumination, etc.

The submersible light 2 generally includes a back cover 4, a lens assembly 6 and a light assembly 8.

II. Back Cover 4

The back cover 4 includes front and back faces 10, 12 and a perimeter 14 with a lip or shoulder 16 extending along the top and sides thereof. A pair of mounting bolt passages are formed in the back cover 4 and are adapted for removeably attaching carriage-type mounting bolts 20 to the back cover 4 with the bolt heads 20a slidably received in respective mounting bolt passages 18 and with the bolt shafts 20b protruding rearwardly through mounting bolt slots 22 which are open to the passages 18. A wiring channel 24 is open at the back face 12 and includes leadwire retainers 26 extending across the channel 24 at suitable locations. The leadwire retainers 26 include routing slots 28. Additional leadwire routing slots 28 are formed along the perimeter 14 at the back cover lower edge where the wiring channel 24 terminates. A pair of mounting bosses 30 project forwardly from the back cover front face 10 and each includes a downwardly-open receiver 30a.

III. Lens Assembly 6

The lens assembly 6 includes a top panel 32a, a front panel 32b and opposite side panels 32c,d. The top and side panels 32a,c,d form a back edge 34 including a flange 36 projecting outwardly and adapted for engagement with the back cover shoulder 16 in a suitable sealed relationship, e.g., welded. A bottom edge 38 is formed by the front and side panels 32b,c,d and defines a lens opening 40. With the lens assembly 6 mounted on the back cover 4, an enclosure 42 is formed which is open downwardly from the opening 40. A foam rubber sealing gasket 44 is mounted on the lens top panel 32a within the enclosure 42. The gasket 44 substantially covers the top panel 32a.

A discrete auxiliary lens 46 has a reflex pattern embossed therein and is mounted within the enclosure 42 adjacent to one of the lens side panels 32c,d. The lens front panel 32b is suitably embossed for transmitting light in a desired pattern. For example, a medial portion 48 of the front panel 32b can have a fresnel configuration, and side portions 50 thereof can have a reflex pattern.

IV. Light Assembly 8

The light assembly 8 includes a housing 52 with front, back and opposite side walls 54a,b,c,d and a floor 56. The housing 52 forms a subenclosure 58 which is upwardly-open at a housing upper edge 60 formed by the walls 54a–d whereby the housing subenclosure 58 is accessible when the light assembly 8 is removed from the back cover 4. The housing upper edge 60 engages the gasket 44 with the light assembly 8 in its installed position whereby the subenclosure 58 is sealed. A plurality (e.g., 3 are shown) of leadwire routing slots 62 are formed in the back wall 54b at the housing upper edge 60. A pair of bosses 64 are attached to the housing floor 56 and project upwardly into the subenclosure 58. The floor 56 includes a longitudinal refraction strip pattern 57 for directing light downwardly from the light 2.

The light assembly 8 includes illumination means 68 comprising, for example, a pair of bulbs 70a,b which are received in first and second sockets 72a,b. The sockets 72a,b are mounted on a bracket 74 which is secured by a mounting screw 76 to a respective boss 64 and is retained in place by a retainer 78 projecting into the subenclosure 58 and interlocking with the bracket 74 whereby the bracket 74 is relatively securely mounted within the subenclosure 58.

A pair of ears 84 project rearwardly from the housing back wall 54b and receive mounting screws 86 which mount the light assembly 8 on the back cover mounting bosses 30 whereby the light assembly 8 is retained in its installed position.

The first socket 72a is coupled to first and second positive leadwires 80a,b, one of which is also connected to the second socket 72. A grounding leadwire 82 is connected to the bracket 74, which in turn is connected to the sockets 72a,b. The bulbs 70a,b are grounded by connecting the grounding leadwire 82 to a suitable ground, such as a trailer frame. The application of a positive potential to the leadwires 80a,b illuminates the bulbs 70a,b. The second bulb 70b can be attached to a common positive leadwire with the first socket 72a. The leadwires 80a,b and 82 are adapted to pass through the leadwire routing slots 28 and 62, and can be positioned in suitable positions of the wiring channel 24. The positive leadwires 80a,b can be connected to an electrical system, such as the electrical system of a vehicle.

V. Construction and Operation

The submersible light 2 can be made from various materials in different sizes and in different colors. For trailer applications, particularly boat trailers which are often submerged in use, the back cover 4, the lens assembly 6 and the housing 52 could comprise a suitable plastic, such as polycarbonate. The lens assembly 6 can be transparent with a desired tint, such as red. The back cover 4 can comprise opaque black plastic. The auxiliary lens 46 can be clear and transparent, since light passing through it will also pass through a respective lens side panel 32c or 32d and acquire a desired color from the latter. The housing 52 can likewise comprise clear material.

With the light assembly 8 in its installed position, the housing subenclosure 58 is substantially sealed, thus protecting the illumination means 68 in a relatively dry environment. The housing subenclosure 58 is maintained dry by two operating characteristics of the submersible light 2: 1) the seal formed by the gasket 44 and the housing upper edge 60; and 2) the bell jar effect of the back cover 4 and the lens assembly 6, whereby submerging the light 2 traps a pocket of air within the lens assembly enclosure 42. Thus, even if one of the sealing means associated with the light 2 is compromised, the other sealing system would protect the subenclosure 58 from water infiltration.

Figure 9:
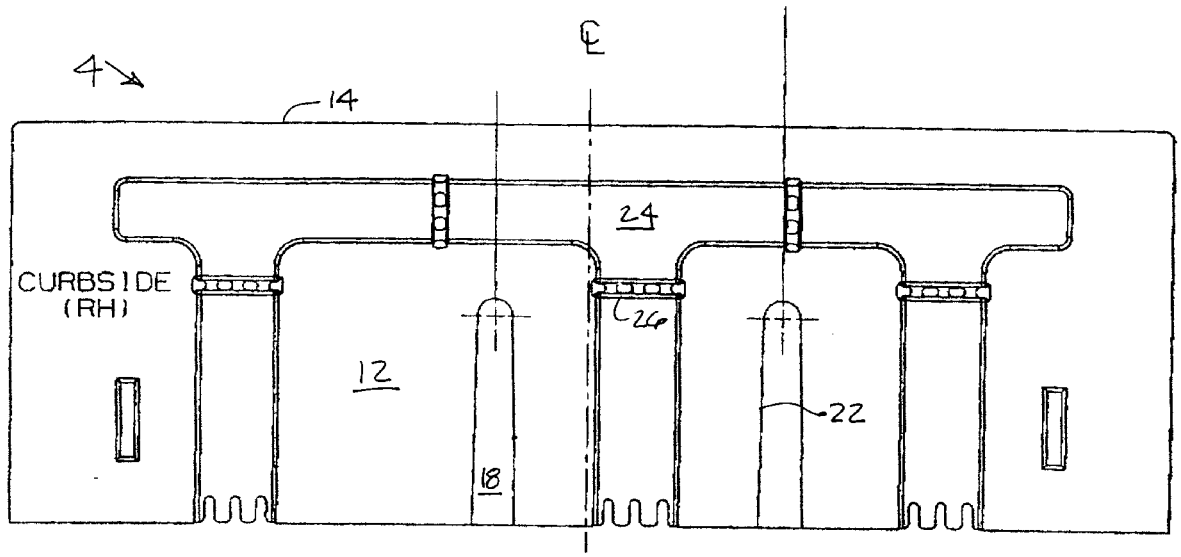
FIG. 9 is a rear elevational view of a right hand version of the light.
Figure 10:
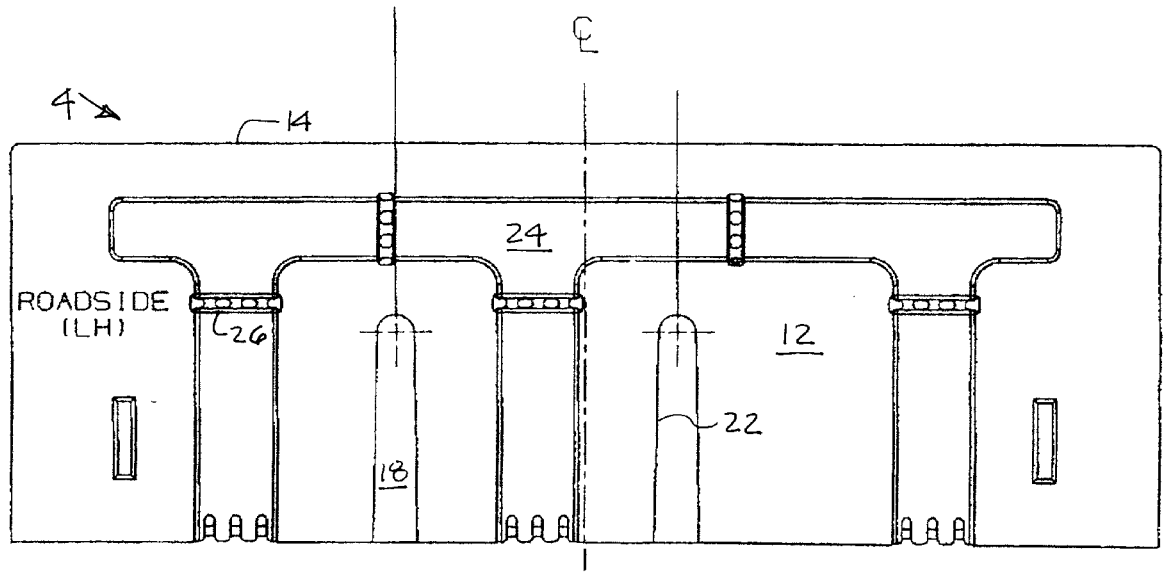
FIG. 10 is a rear elevational view of a left hand version of the light.

The components of the light 2 are generally reversible. Right and left versions can thus be made with most of the components being compatible with either version. The back cover 4 can be molded in right and left versions which are mirror images of each other, as shown in FIGS. 9 and 10.

It is to be understood that while certain forms of the present invention have been illustrated and described herein, it is not to be limited to the specific forms or arrangement of parts described and shown.

What is claimed and desired to be secured by Letters Patent is as follows:

1. A submersible light, which includes:
   a) a back cover with front and back faces;
   b) a lens assembly including:
      (1) a lens with a top panel, a front panel and a pair of opposite side panels;
      (2) said lens top and side panels forming a lens back edge;
      (3) attachment means for attaching said lens back edge to said back cover front face;
      (4) said front and side panels forming a bottom edge, said bottom edge and said back cover defining a bottom opening;
      (5) a bell jar lens assembly enclosure formed by said lens assembly and said back cover; and
      (6) a gasket mounted on said lens top panel within said lens assembly enclosure; and
   c) a light assembly including:
      (1) a housing with a housing upper edge and a subenclosure;
      (2) housing mounting means for removeably mounting said housing in said lens assembly enclosure;
      (3) a removed position removed from said lens assembly with said subenclosure open at said housing upper edge;
      (4) an installed position with said housing upper edge engaging said gasket in a sealing relation therewith whereby said subenclosure is enclosed; and
      (5) illumination means located within said subenclosure.

2. The submersible light according to claim 1, which includes:
   a) said back cover including light mounting means for mounting said light.

3. The submersible light according to claim 2, wherein said light mounting means includes:
   a) a mounting bolt head passage formed in said back cover and open at said back face, said passage being adapted to receive the head of a mounting bolt with said mounting bolt shaft protruding from said back face.

4. The light according to claim 1, which includes:
   a) a plurality of wiring channels formed in said back cover and open at said back face.

5. The light according to claim 1, which includes:
   a) said back cover having a pair of light assembly mounting bosses projecting forwardly from its front face and releasably connected to said light assembly mounting means.

6. The light according to claim 1, which includes:
   a) said lens front panel including a fresnel lens portion.

7. The light according to claim 6, which includes:
   a) said fresnel lens portion being located medially with respect to said lens front panel; and
   b) said lens front panel including a pair of reflex portions each located on a respective each side of said fresnel lens portion.

8. The light according to claim 1, which includes:
   a) a discrete auxiliary lens located within said enclosure adjacent to one of said lens side panels, said auxiliary lens having a reflex embossing pattern.

9. The light according to claim 1, which includes:
   a) said lens having a flange adjacent to said lens back edge, said flange projecting outwardly from said lens top and side panels.

10. The light according to claim 1 wherein said lens is welded at its back edge to said back cover front face.

11. The light according to claim 1, wherein said gasket comprises foam rubber and covers a substantial portion of said lens top panel, said gasket being compressed with said light assembly in its installed position.

12. The light according to claim 1, wherein said light assembly housing includes:
    a) a front wall;
    b) a back wall;
    c) opposite side walls;
    d) a floor; and
    e) said front and side walls being located adjacent to said lens front and side walls respectively with said light assembly in its installed position.

13. The light according to claim 12, which includes:
    a) said illumination means including a bracket mounted on said housing within said subenclosure
    b) a socket mounted on said bracket; and
    c) a bulb installed in said socket.

14. The light according to claim 13, which includes:
    a) a positive electrical leadwire connected to said socket; and
    b) a negative electrical leadwire connected to said bracket.

15. The light according to claim 14, which includes:
    a) a plurality of leadwire routing slots formed in said housing back wall at said housing upper edge, each said routing slot receiving a respective leadwire.

16. The light according to claim 14, which includes:
    a) said socket comprising a first socket;
    b) said bulb comprising a first bulb;
    c) a second socket mounted on said bracket;
    d) a second bulb installed in said second socket; and
    e) a second positive leadwire connected to said second socket.

17. The light according to claim 5, which includes:
    a) said housing including a pair of ears projecting rearwardly therefrom, each said ear receiving a respective mechanical fastener and each said mechanical fastener extending into a respective mounting boss of said back cover with said light assembly in its installed position.

18. The light according to claim 1, which includes:
    a) said back cover includes a lower edge and a plurality of leadwire routing slots open at said back cover lower edge.

19. The light according to claim 4, wherein said back cover includes a plurality of leadwire retainers located within said wiring channels, each said leadwire retainer including a plurality of leadwire routing slots.

* * * * *